(12) United States Patent
Wang et al.

(10) Patent No.: US 10,444,939 B2
(45) Date of Patent: Oct. 15, 2019

(54) ANALYSIS OF RECURRING PROCESSES

(71) Applicant: Microsoft Technology Licensing, LLC, Redmond, WA (US)

(72) Inventors: Jiahui Wang, Redmond, WA (US); Yaron Burd, Bellevue, WA (US); Omid Afnan, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

(21) Appl. No.: 15/070,724

(22) Filed: Mar. 15, 2016

(65) Prior Publication Data

US 2017/0269796 A1    Sep. 21, 2017

(51) Int. Cl.
  *G06F 3/0482*    (2013.01)
  *G06F 17/27*    (2006.01)
  *G06F 3/0484*    (2013.01)
  *G06F 9/48*    (2006.01)
  *G06F 11/32*    (2006.01)

(52) U.S. Cl.
  CPC .......... *G06F 3/0482* (2013.01); *G06F 3/0484* (2013.01); *G06F 9/4843* (2013.01); *G06F 11/321* (2013.01); *G06F 17/27* (2013.01)

(58) Field of Classification Search
  CPC ...... G06F 3/0482; G06F 17/27; G06F 3/0484; G06F 9/4843; G06F 11/321; G06F 3/0483; G06F 8/60; G06F 8/00
  See application file for complete search history.

(56) References Cited

U.S. PATENT DOCUMENTS

| | | | |
|---|---|---|---|
| 5,893,905 A | 4/1999 | Main et al. | |
| 6,502,121 B1 | 12/2002 | Threlkeld | |
| 6,560,620 B1 * | 5/2003 | Ching | G06F 17/27 707/999.202 |
| 7,617,205 B2 | 11/2009 | Bailey et al. | |
| 7,747,601 B2 | 6/2010 | Cooper et al. | |

(Continued)

FOREIGN PATENT DOCUMENTS

WO    2015060844    4/2015

OTHER PUBLICATIONS

Michael Horowitz, "Reviewing the Windows Scheduler with TaskSchedulerView from Nir Sofer", Aug. 2, 2015, Computerworld, https://www.computerworld.com/article/2955124/microsoft-windows/reviewing-the-windows-scheduler-with-taskschedulerview-from-nir-sofer.html.*

(Continued)

*Primary Examiner* — Aaron Lowenberger
(74) *Attorney, Agent, or Firm* — Workman Nydegger

(57) ABSTRACT

Comparing recurring processes. A method includes automatically identifying a plurality of recurring process instances having one or more commonalities. The method further includes displaying the plurality of recurring process instances having one or more commonalities to a user in a user interface. The method further includes receiving user input at the user interface selecting a first recurring process instance from the plurality of recurring process instances. The method further includes receiving user input at the user interface selecting a second recurring process instance from the plurality of recurring process instances. The method further includes automatically identifying differences in the first and second recurring process instances. The method further includes presenting the differences in the graphical user interface to the user.

21 Claims, 10 Drawing Sheets

(56) References Cited

U.S. PATENT DOCUMENTS

| | | | |
|---|---|---|---|
| 7,840,538 B2 | 11/2010 | Joshi et al. | |
| 7,992,050 B2 | 8/2011 | Melamed et al. | |
| 8,560,509 B2 | 10/2013 | Xia et al. | |
| 8,635,203 B2 | 1/2014 | Chennavasin | |
| 9,141,665 B1 | 9/2015 | Munro et al. | |
| 2003/0065986 A1* | 4/2003 | Fraenkel ............. | G06F 11/3006 714/47.2 |
| 2005/0283458 A1 | 12/2005 | Galindo-Legaria et al. | |
| 2006/0195490 A1* | 8/2006 | Toebes .............. | G06F 17/30067 |
| 2007/0143246 A1 | 6/2007 | Bestgen et al. | |
| 2011/0258628 A1* | 10/2011 | Devadhar ............... | G06F 9/546 718/100 |
| 2012/0016867 A1* | 1/2012 | Clemm ............... | G06F 17/2211 707/722 |
| 2015/0161266 A1 | 6/2015 | Conradt et al. | |
| 2015/0301861 A1 | 10/2015 | LaChiusa et al. | |

OTHER PUBLICATIONS

Morimoto et al., Windows Server 2008 Unleashed, 2008, Sams Publishing, (Year: 2008).*
International Search Report and the Written Opinion issued in PCT Patent Application No. PCT/US2017/021231 dated May 19, 2017.
Bruno, et al., "Recurring Job Optimization in Scope", In Proceedings of the ACM SIGMOD International Conference on Management of Data, May 20, 2012, 2 pages.

* cited by examiner

*Figure 2C*

| Property Name | Left Job | Right Job |
|---|---|---|
| Time in Queue | 00:02:26 | 00:01:53 |
| VC Percent Allocation | 8 | 6 |
| Job allocation | 119 | 119 |
| Useful PN hours | 01:17:27.123 | 01:13:37.453 |
| Useful PN hours | 1.07% | 1.03% |
| Useful CPU Time | 00:37:20:681 | 00:37:26:193 |
| PN Hours Wasted By Discarded Duplicates | 00:00:33.642 | 00:00:01.803 |
| Intermediate Data Size | 0.76 GB | 0.77 GB |
| Scheduling Efficiency | 46.73% | 39.65% |
| High Priority Token Utilization Efficiency | 47.06% | 38.49% |
| High Priority Token Utilization Quality | 50.47% | 42.89% |
| Duplicate Scheduling Ratio | 2.81% | 2.26% |
| Duplicate Scheduling Efficiency | 66.60% | 68.75% |
| Allocation Efficiency | 21.41% | 22.10% |
| Execution Density | 20.53% | 21.08% |
| Job Initialization | 3.5% | 4.57% |
| Vertex Initialization | 12.64% | 13.26% |
| Low Currency Density | 63.33% | 61.09% |
| CongestionControlImpact | 1.00 | 1.00 |
| CongestionControlBackoffDOPInsideWindowCount | 0 | 0 |
| CongestionControlBackoffDOPOutsideWindowCount | 0 | 0 |

ANALYSIS OF RECURRING PROCESSES

BACKGROUND

Background and Relevant Art

Computers and computing systems have affected nearly every aspect of modern living. Computers are generally involved in work, recreation, healthcare, transportation, entertainment, household management, etc.

Computing systems allow for the definition, scheduling and automated execution of recurring processes. A recurring process is a computing job, including a number of computing operations (which may include user code and/or system code), that is instantiated and performed at various times according to some user defined scheduling.

Many production systems rely on data being available at consistent cadences. Using distributed systems and recurring processes to process data at regular intervals is a useful and simple way to facilitate this. However, many factors can hinder consistent performance resulting in variances from process recurring instance to recurring process instance. Debugging these variances and slow-downs requires walking through, potentially, an extremely high number of combination of variables such as data size changes, data distribution changes, optimizer cost implication, cluster resource exhaustion, code bugs, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment. The method includes acts for comparing recurring processes. The method includes automatically identifying a plurality of recurring process instances having one or more commonalities. The method further includes displaying the plurality of recurring process instances having one or more commonalities to a user in a user interface. The method further includes receiving user input at the user interface selecting a first recurring process instance from the plurality of recurring process instances. The method further includes receiving user input at the user interface selecting a second recurring process instance from the plurality of recurring process instances. The method further includes automatically identifying differences in the first and second recurring process instances. The method further includes presenting the differences in the graphical user interface to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2C illustrates a summary comparison window of the user interface;

FIG. 2D illustrates displaying additional statistics information in the user interface;

FIG. 2E illustrates a code differences interface in the user interface;

DETAILED DESCRIPTION

Embodiments illustrated herein include a process for automatically identifying instances of recurring processes and then providing to a user, in a user interface, an aggregation of the identified instances of recurring processes. The user can then select two or more different process instances from an aggregation of process instances for finer detail comparison.

Embodiments can then identify and highlight for a user, in a user interface, differences between instances of a recurring process. In some embodiments, differences can be classified and then identified to a user based on degree of differences. For example, a system can identity that there are no differences between different instances of a recurring process for certain aspects of the recurring process. Alternatively or additionally, a system can identify that there are minor differences between different instances of a recurring process for certain aspects of the recurring process. Alternatively or additionally, a system can identity that there are significant differences between different instances of a recurring process for certain aspects of the recurring process. Different degrees of difference could be highlighted by color, feature size (such as font or image size), animation (e.g., faster or more pronounced animation), audible warnings (for example, moving cursor over an identified feature may cause certain amount of sound) haptic feedback (mousing over feature may cause mouse to vibrate at an intensity that is based on a level of difference), etc.

Figure 1:
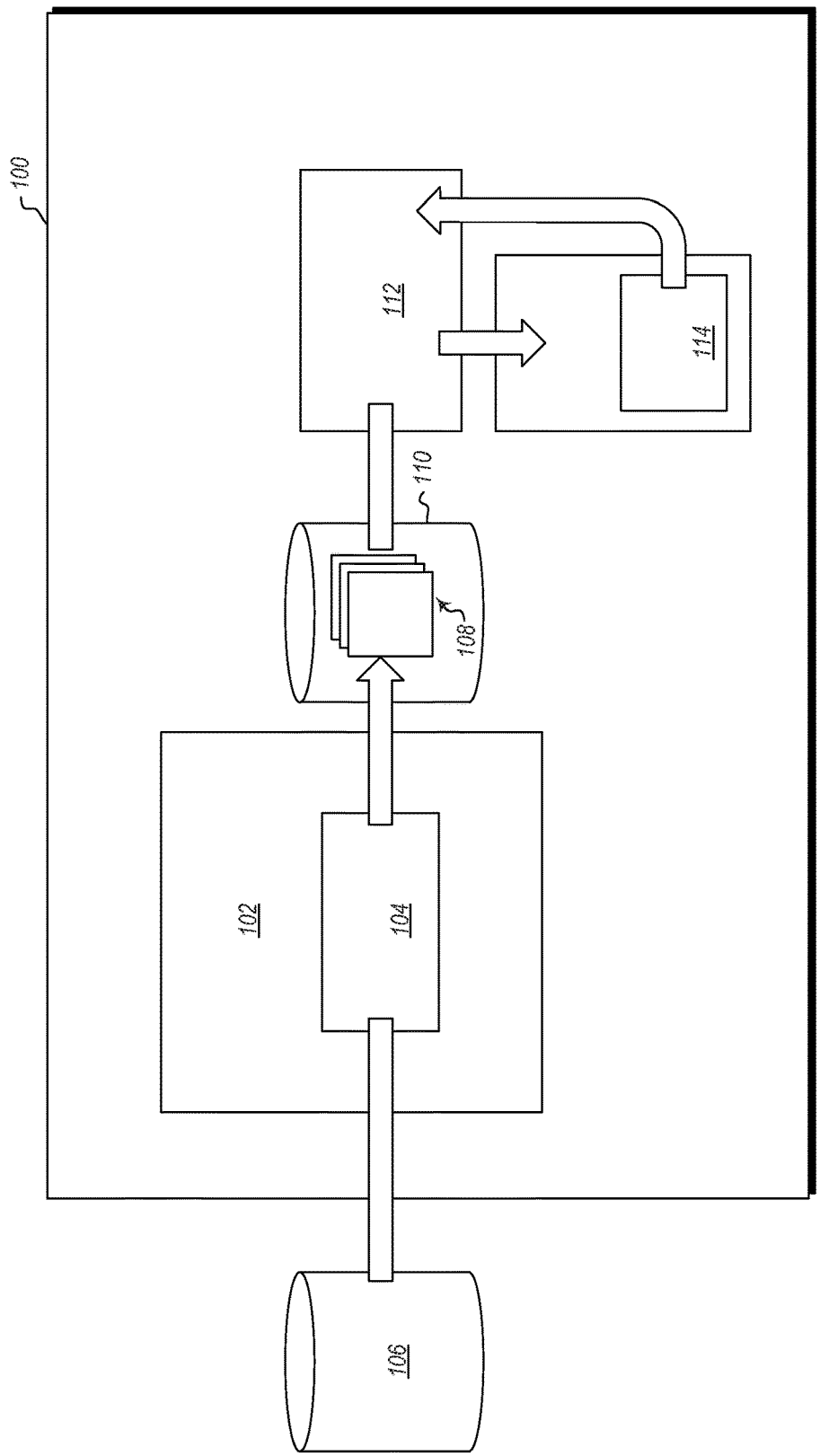
FIG. 1 illustrates a process analysis system.

Referring now to FIG. 1, an example is illustrated. FIG. 1 illustrates a process analysis system 100. The process analysis system 100 includes an automatic process instance matching engine 102. The automatic process matching engine 102 is configured to identify different instances of a same recurring process. In particular, the process instance matching engine 102 automatically identifies a plurality of recurring process instances having one or more commonalities. FIG. 1 illustrates that the instance matching engine 102 includes a comparator 104. The comparator 104 is configured to compare various instances of recurring processes to identify instances of the same recurring process. The comparator 104, may be, for example, a digital system that is configured to analyze data characteristics to determine their similarity or differences. The comparator 104 may have certain threshold settings that determine when data items are sufficiently similar.

For example, instances of recurring processes can be stored at a datastore 106. Storing instances of recurring processes may include storing information factors such as name of the instance, process definition details, execution details (e.g., when and where the process instance was executed), user that submitted a process, account used when a process was submitted, API(s) and/or tools used to submit a process, etc. The datastore 106 may also store execution details, such as when a recurring processes completed execution, data generated by the recurring processes, errors identified by running recurring processes, etc.

The comparator 104 accesses the datastore 106 to examine factors to identify instances of recurring processes that are sufficiently similar. For example, the comparator 104 may identify all instances of recurring processes that have the same or similar (within some predefined threshold) naming convention. The comparator 104 may identify all instances of recurring processes that have the same or very similar (within some predefined threshold) execution details. The comparator 104 may identify all instances of recurring processes that have the same or very similar (within some predefined threshold) process definition details, etc. Each of these may be used alone or in combination to determine that a set of instances of recurring processes all should be grouped together as belonging to the same recurring process. For example, in some embodiments, different factors may be indicative that instances should or should not be grouped together. A threshold may be established for similarity. If the threshold is reached, instances will be grouped together. In some embodiments, the threshold may be a confidence level that is user configurable to allow system administrators to manually fine tune which instances of recurring processes are grouped together. In some embodiments, users may be able to select which of the factors to consider for determining that instances of recurring processes should be grouped together in the same recurring process. In other systems, thresholds and factors may be set by the system, and not able to be configured by the user.

The comparator 104 can output process groups 108, where each process group is an identification of process instances that belong to the same recurring process as identified by the comparator 104. The process groups 108 can be stored in a datastore 110 at the process analysis system 100, where such information can later be provided to a user in a user interface 112.

Illustrating now further details, the user interface 112 can obtain process groups from the datastore 110. The process groups can be displayed to a user at the user interface 112. The user can select a process group for a recurring process for further analysis. The user can then select individual instances of the recurring process at the user interface 112 for comparison. The individual instances of the recurring process are provided to an instance comparator 114.

The instance comparator 114 is able to determine differences between, in the illustrated examples below, two different instances of a recurring process. In particular, the instance comparator 114 can compare various details of different instances of a recurring process to identify differences in properties, and in some embodiments, levels of differences in properties, between the different instances of a recurring process.

For example, the comparator can determine if there are differences between different instances of a recurring process in one or more of process duration; property names; time in queue; resource (e.g., memory, CPU, I/O) allocation (e.g., percent of allocation of total available resources); process allocation; useful resource usage (e.g., CPU, memory and I/O) hours; bonus resource usage hours; useful cpu time; resource hours wasted by discarded duplicates; intermediate data size; scheduling efficiency; high priority token utilization efficiency; high priority token utilization quality; duplicate scheduling ration; duplicate scheduling efficiency; allocation efficiency; execution density; process initialization; vertex initialization; low concurrency density; congestion control impact; congestion control backoffdopindisdewindow count; congestion control backoffdopoutsidewindow count; etc.

Differences may have different levels of difference. For example, the instance comparator 114 may identify that some properties have little to no difference between the different instances of a recurring process. The instance comparator 114 may identify that some properties have slight differences between different instances of a recurring process. The instance comparator 114 may identify that some properties have significant differences between different instances of a recurring process. And in some embodiments, the instance comparator may identify that properties are missing in one instance as compared to another instance of a recurring process.

Some embodiments may group differences into categories (such as no differences, minor differences, significant difference, or missing). Various upper and lower thresholds can be used to determine which category a comparison between two properties falls into. For example, a 0 to 1% difference may be identified as belonging to a 'no difference' category. A 1 to 10% difference may be identified as belonging to a 'minor difference' category. A 10 to 100% difference may be identified as belonging to a 'significant difference' category. Note that these values are for example only, and different values may be used, or in some embodiments, a user may select custom values. As will be shown below, number of differences in each category can be identified, and/or individual difference can be identified by category.

Note that while a fairly coarse granularity (i.e. four threshold categories) has been shown above, it should be appreciated that in other embodiments, liner granularity, or even virtually fluid granularity can be implemented.

Various different indicators may be used to highlight level of difference of properties between instances of recurring processes in a user interface for a user. For example, in some embodiments, different degrees of difference could be highlighted by color. For example, significant differences may be highlighted in the user interface in red. Minor differences may be highlighted in orange or yellow in the user interface. No differences may be highlighted in green (or in the examples below not at all) in the user interface. Missing properties may be highlighted in blue in the user interface. Of course those of skill in the art will recognize that these are only examples and other colors or combinations of colors may be used.

Alternatively, embodiments may highlight level of difference of properties between instances of recurring processes in a user interface for a user by changing feature size (such as font size or image size). For example, larger fonts may be used to identify larger differences.

Alternatively, embodiments may highlight level of difference of properties between instances of recurring processes in a user interface for a user by changing animations. For example, faster or more pronounced animations may identify larger differences in properties.

Alternatively, embodiments may highlight level of difference of properties between instances of recurring processes in a user interface for a user by changing audible warnings. For example, moving a cursor over an identified property may cause certain amounts of sound, with louder sounds being emitted for larger differences between properties.

Alternatively, embodiments may highlight level of difference of properties between instances of recurring processes in a user interface for a user by changing haptic feedback. For example, moving a cursor over a property may cause a device, such as a mouse with haptic feedback, to vibrate based on level of difference.

While a few examples are illustrated above, it should be appreciated that other modalities may be used to highlight levels of difference of properties between instances of recurring processes in a user interface for a user.

Figure 2A:
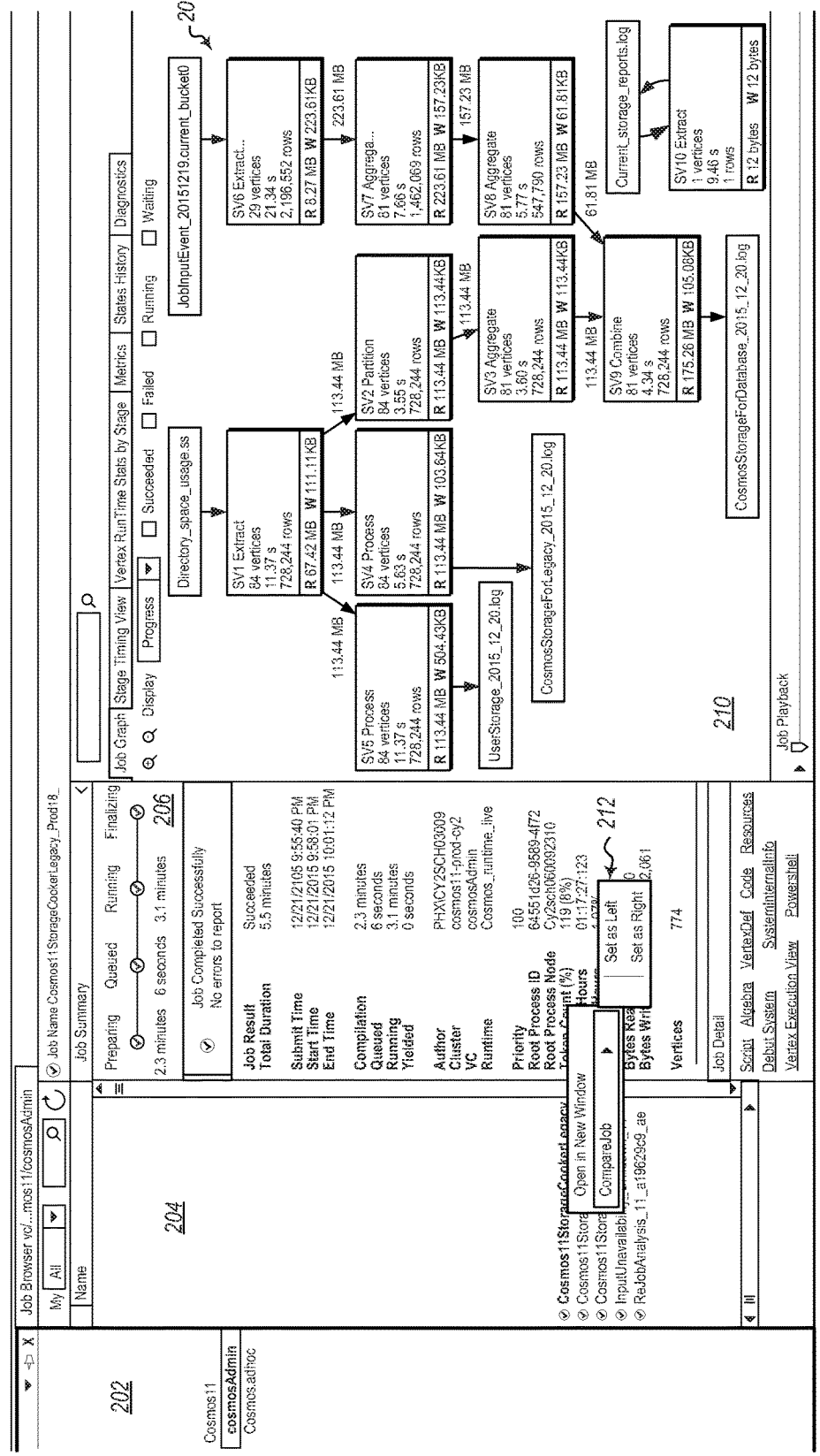
FIG. 2A illustrates a user interface and selection of a first process instance for comparison.

Referring now to FIGS. 2A through 2G an example user interface is illustrated showing how some embodiments of the invention might be implemented. FIG. 2A illustrates a user interface 200. The user interface 200 includes a process selection window 202. Here, a user can select a given recurring process. Once the user selects a given process, a list of instances of the recurring process are displayed in process instance window 204.

A user can select a first instance from the process instance window 204. Selecting the first instance in the process instance window 204 causes process summary information to be displayed in a process summary window 206.

The process summary window 206 can display various details about a process instance, such as process result (e.g., did the process succeed or fail); total duration of the process instance; when the process instance was submitted, start time of the process instance; end time of the process instance; compilation time of the process instance; how long the process instance was queued; how long the process instance was running; yielded (i.e., paused in favor of a process with a higher priority); the author of the process instance; what cluster ran the process instance; VC for the process instance; the runtime for the process instance; the priority of the process instance; a root process ID for the process instance; a rood process node for the process instance; a token count for the process instance; useful resource usage hours for the process instance; bonus resource usage hours for the process instance; bytes read for the process instance; bytes written for the process instance; vertices for the process instance; etc.

The user interface 200 may further display a process graph 208 for the process instance in a process graph window 210 showing a graphical representation of various operations for the process instance.

FIG. 2A illustrates that a user can select the process instance as a process instance for comparison. In particular, the user interface 200 allows the user to select the process instance as an instance to compare as illustrated at 212. The process instance selected in FIG. 2A is selected as the 'left' instance in this example.

Figure 2B:
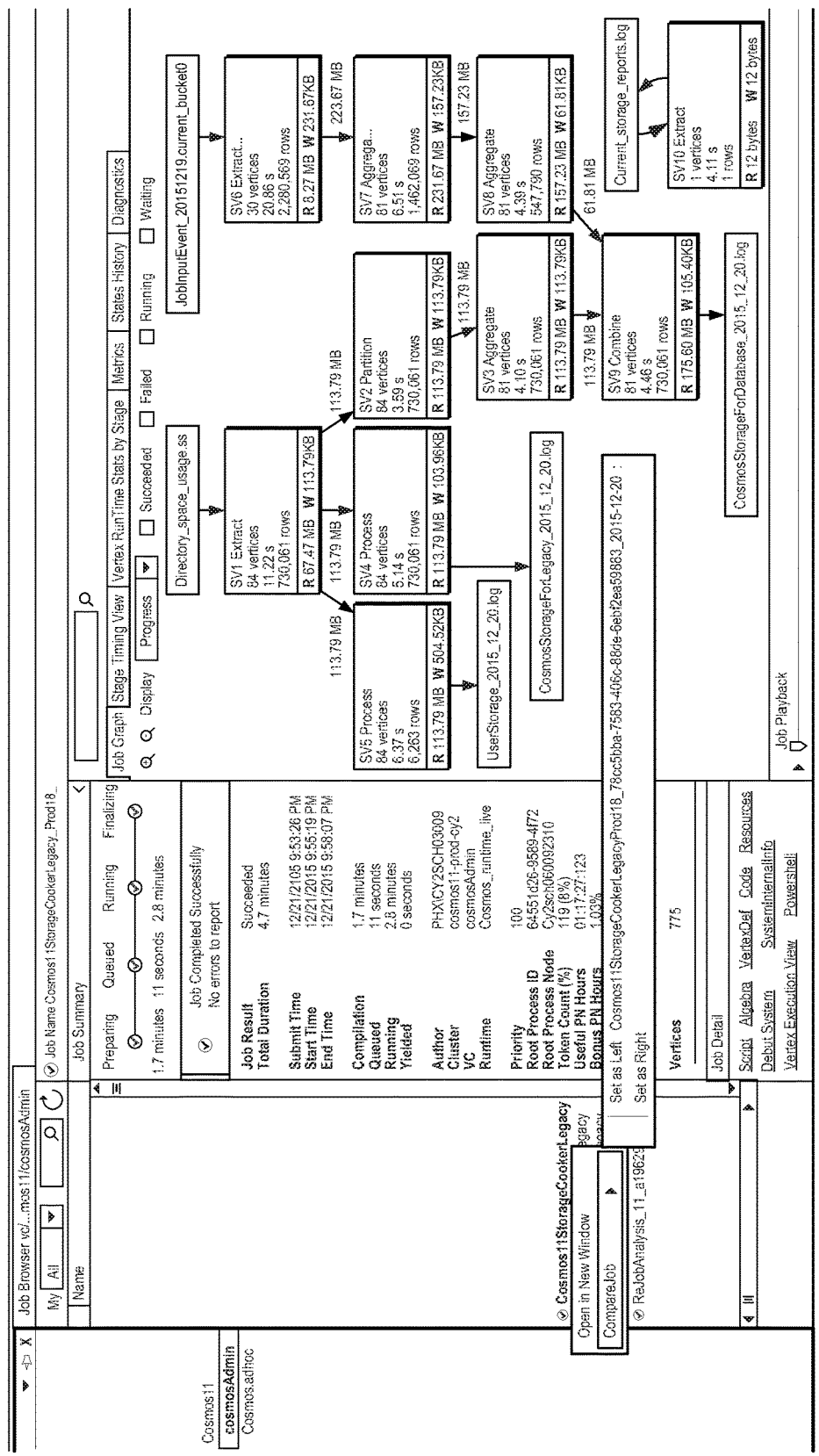
FIG. 2B illustrates selection of a second process instance for comparison.

FIG. 2B illustrates that a different instance is selected as a 'right' instance for comparison.

Figure 2C:
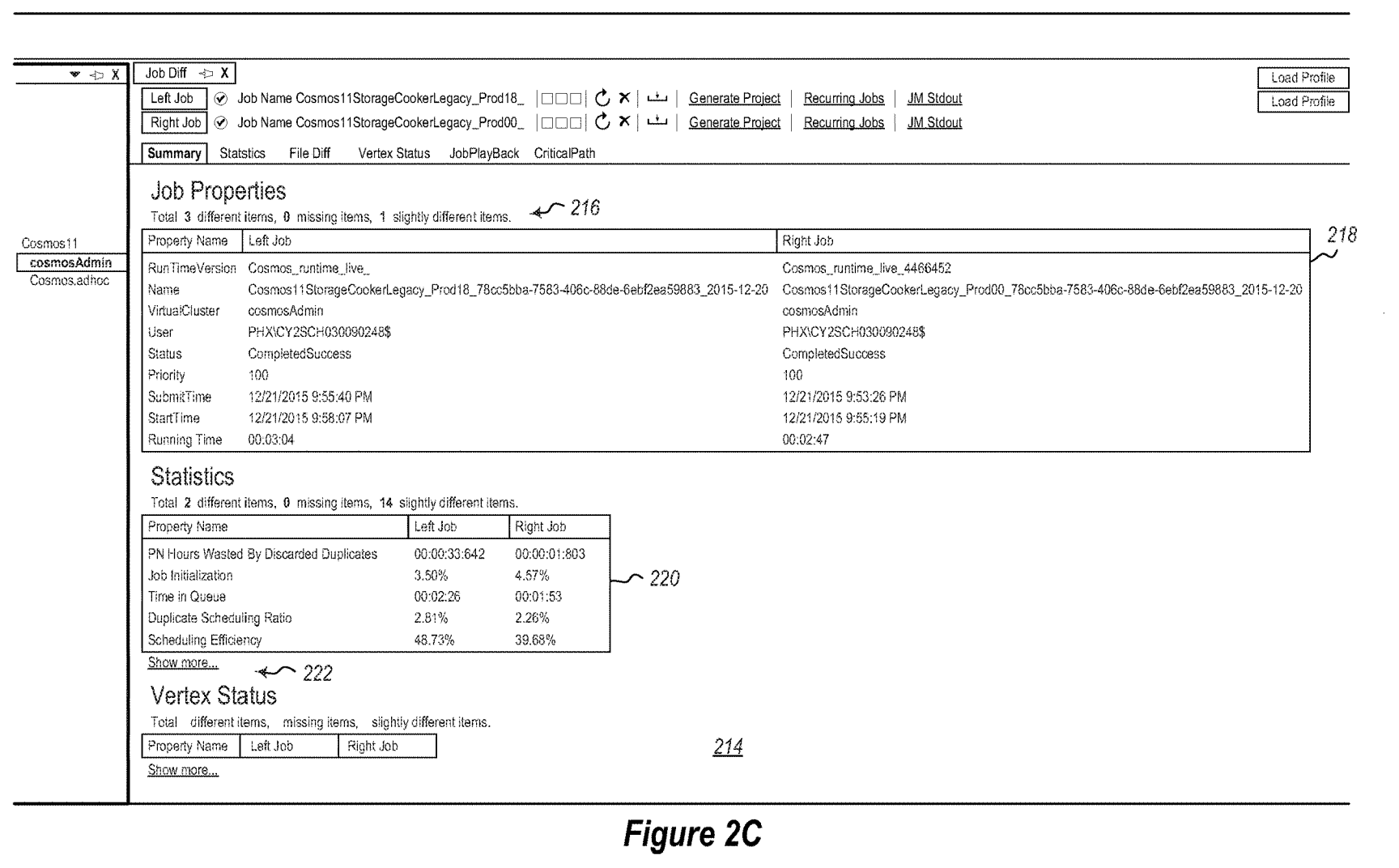

FIG. 2C illustrates a summary comparison window 214. The summary comparison window 214 summarizes the number of differences and the degree of difference, as illustrated at 216. Not that color coding, animation, or other feedback may be used to demonstrate the degree of difference between items (such as properties or statistics). Thus, red text may be used to show significant differences, blue may be used to show missing items, and orange may be used to show slightly different items.

FIG. 2C shows a detailed comparison of process properties at 218. By showing the actual properties from different process instances together, a user can perform a visual inspect to identify the exact differences between the properties. In some embodiments, the properties may be color coded to identify the magnitude of differences. Thus, for example, properties may be printed in red text to show significant differences between instances, black to show no difference, and orange to show minor differences. Of course other color schemes may be used. Indeed, in some embodiments, a heat map may be used to show a fairly fluid representation of differences. For example, red would represent larger differences while violet would represent lesser differences. Colors on the spectrum between these colors would represent varying levels of difference based on their position in the spectrum. Similarly, a large font size could represent a large difference, while a small font size represents little or no difference. Font sizes in-between these could represent varying differences. Similar functionality may be implemented with different animations (magnitude, speed, and or frequency); haptic feedback; or other feedback.

FIG. 2C further illustrates that statistics details can be shown for the two instances as illustrated at 220.

As illustrated at 222, a user can request additional statistics information, which is shown in FIG. 2D.

Figure 2E:
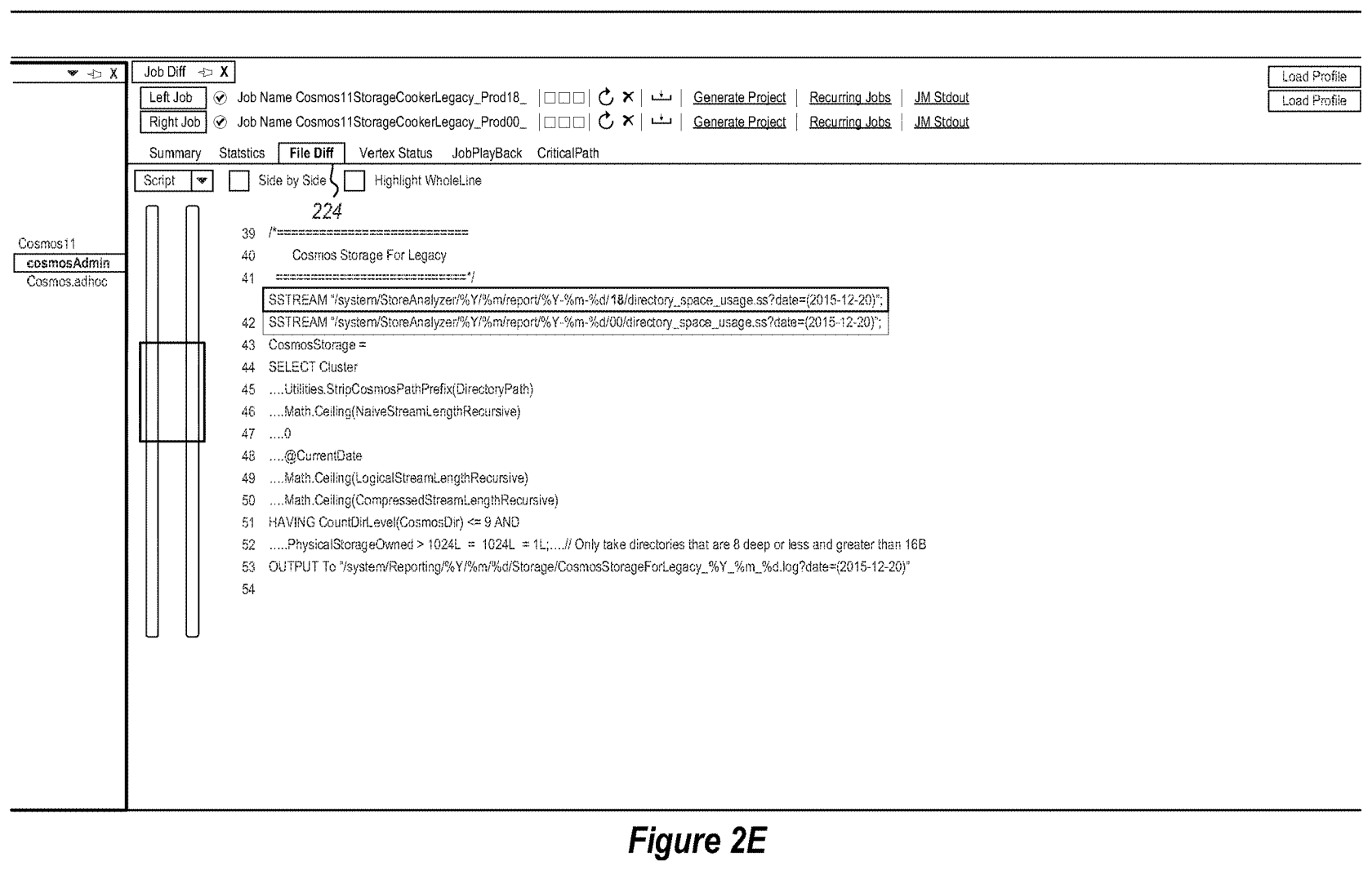

At 224 of FIG. 2E, a user can select a 'File Diff' interface which shows differences in code for the difference instances. In the example illustrated, when differences occur, there are shown in the same line, with differences highlighted to allow for a user to easily identify exact differences.

Figure 2F:
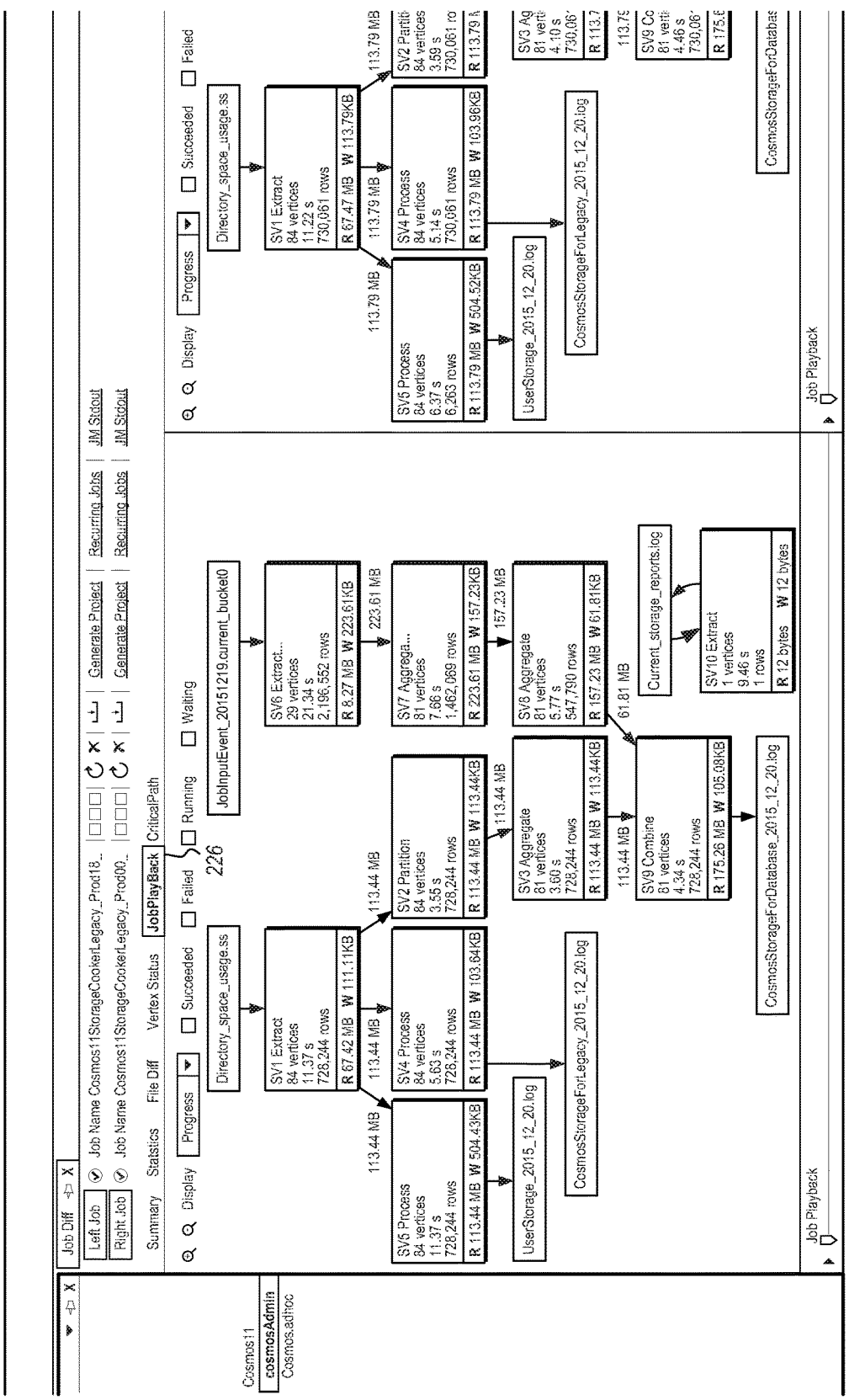
FIG. 2F illustrates a process playback interface in the user interface.
Figure 2F:
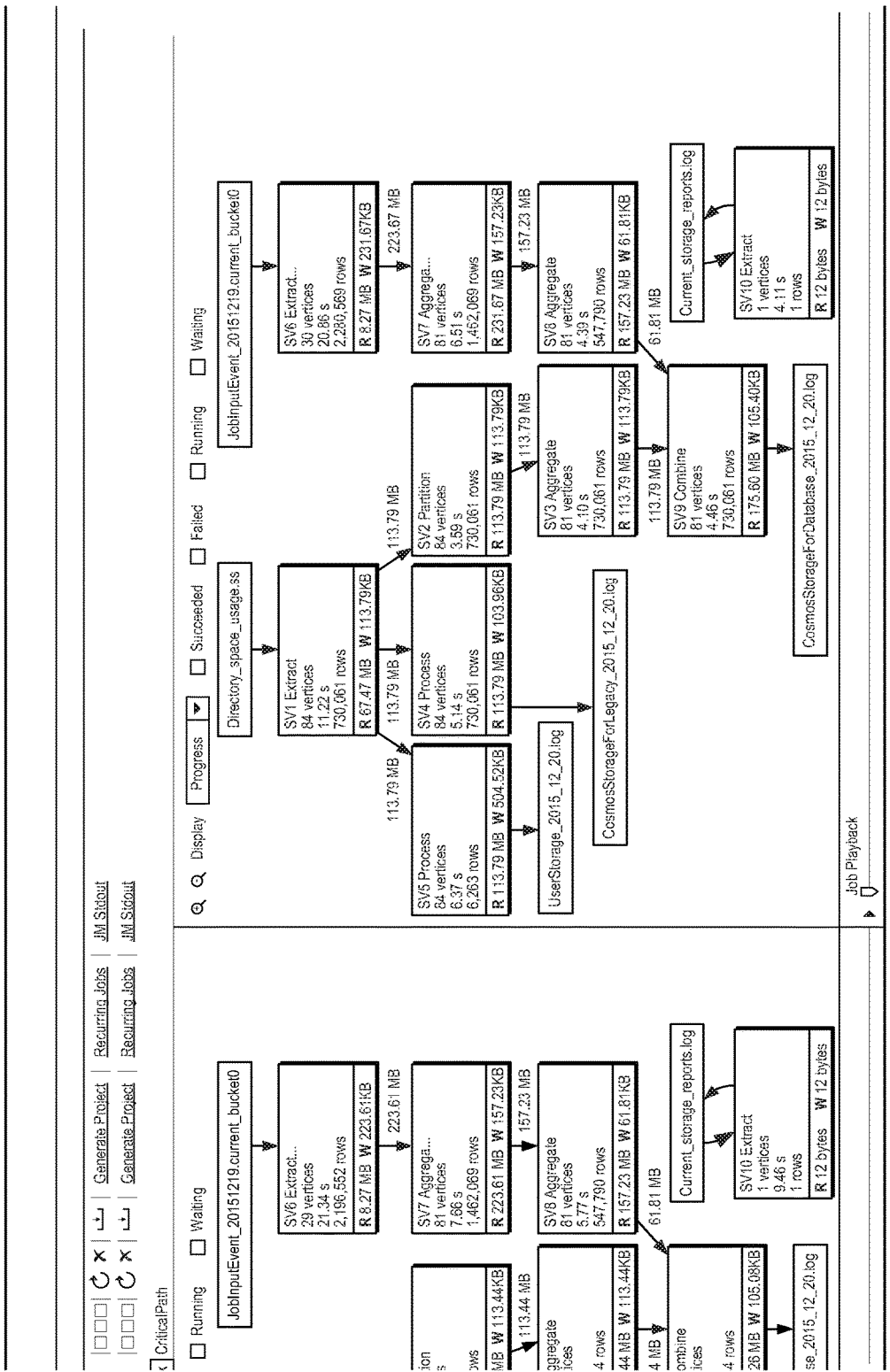

As illustrated at 226 in FIG. 2F, process playback can be selected which causes a graphical illustration of process playback to be illustrated.

Figure 2G:
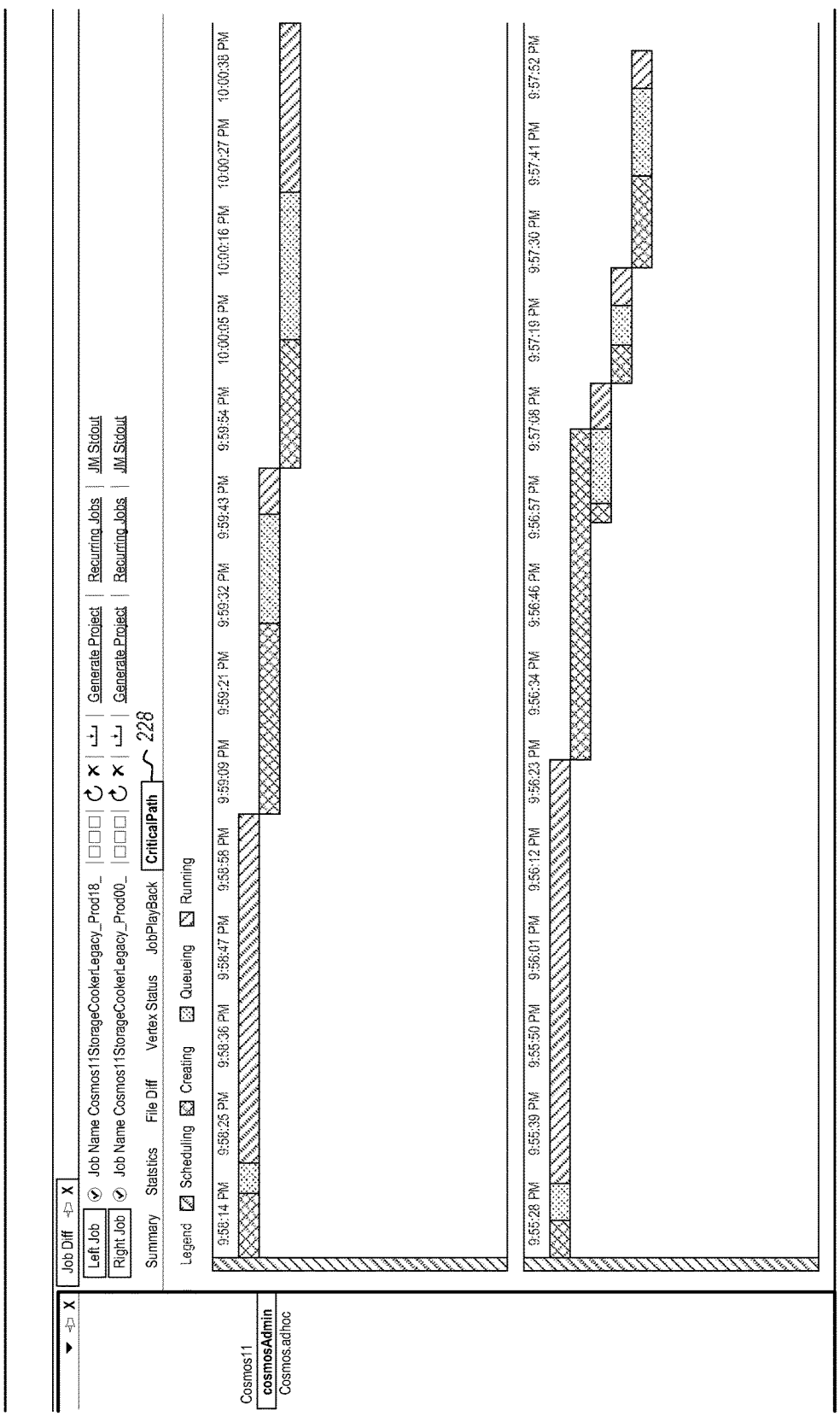
FIG. 2G illustrates a user interface showing a critical path.

As illustrated at 228 in FIG. 2G, a 'Critical Path' interface can be selected, which shows a Gantt chart of the critical path for each of the instances. In particular, cloud processes typically involve a number of different stages coupled together. Each stage includes one or more vertices. Each vertex in a stage performs a given set of operations. Typically all vertices in a stage perform the same set of operations, but on different data. From stage to stage, there are parent-child relationships between vertices. Thus, for example, a vertex in one stage will be a parent or child to a different vertex in a different stage. The parent child relationships define operation and/or data flow. Embodiments illustrated herein can identify single parent-child sequence operation paths. In some embodiments, the single parent-child sequence path may be a critical path. The critical path is defined as the longest running, single path, parent-child vertex sequence of a process. A single path is one in which each parent has only a single child and each child has only a single parent. With the critical path identified, developers are able to focus quickly on the areas that are needed for improvement. In some embodiments, the critical path for different instances can be graphically presented to the user, in a user interface, in Gantt charts so that the user can quickly and efficiently identify vertices that differ.

Thus, for example, recurring processes belonging to the same recurring process are first identified, for example, using patterns in naming of the associated process or input/output files. The process definition and execution history across multiple instances of the recurring process are then analyzed as a set and presented in a combined graphical view. Individual pairs of process runs (i.e., recurring process instances) can then be identified by a user in a user interface for fine-grain comparison and troubleshooting. Visual patterns can identify problems (same amount of data, slower execution, etc.) which can then be analyzed by selecting a pair of process runs related to the graphical data points. The process analysis system a then identifies significant differences worthy of the developer's attention.

This automates and simplifies the frequent task of trying to understand why process behavior changed. For example, a user may be able to quickly and efficiently identify, using the user interface, why a process is running slower than usual. With this functionality, the time for a developer to find a recurring process and analyze interesting differences is greatly reduced. Many recurring processes have time constraints for completion, making identification of delays and problems a high value activity."

The 'recurring process analysis tools' speeds up and facilitates the developer's task of finding these sources of variability by being able to observe, pivot, and drill down on a summarized view of all the variables, do graphical comparison of critical components and use automatic highlighting of major sources of differences. All this functionality is enabled without the user having to make any code changes to their existing processes.

The approach for this feature uses a consistent process model, a data-oriented matching model, together with formulas for identifying significant variations, and a visual framework for representing multiple process variables across multiple runs. This results in very fast and consistent process analysis that takes into account potential process issues specific to big data processes The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
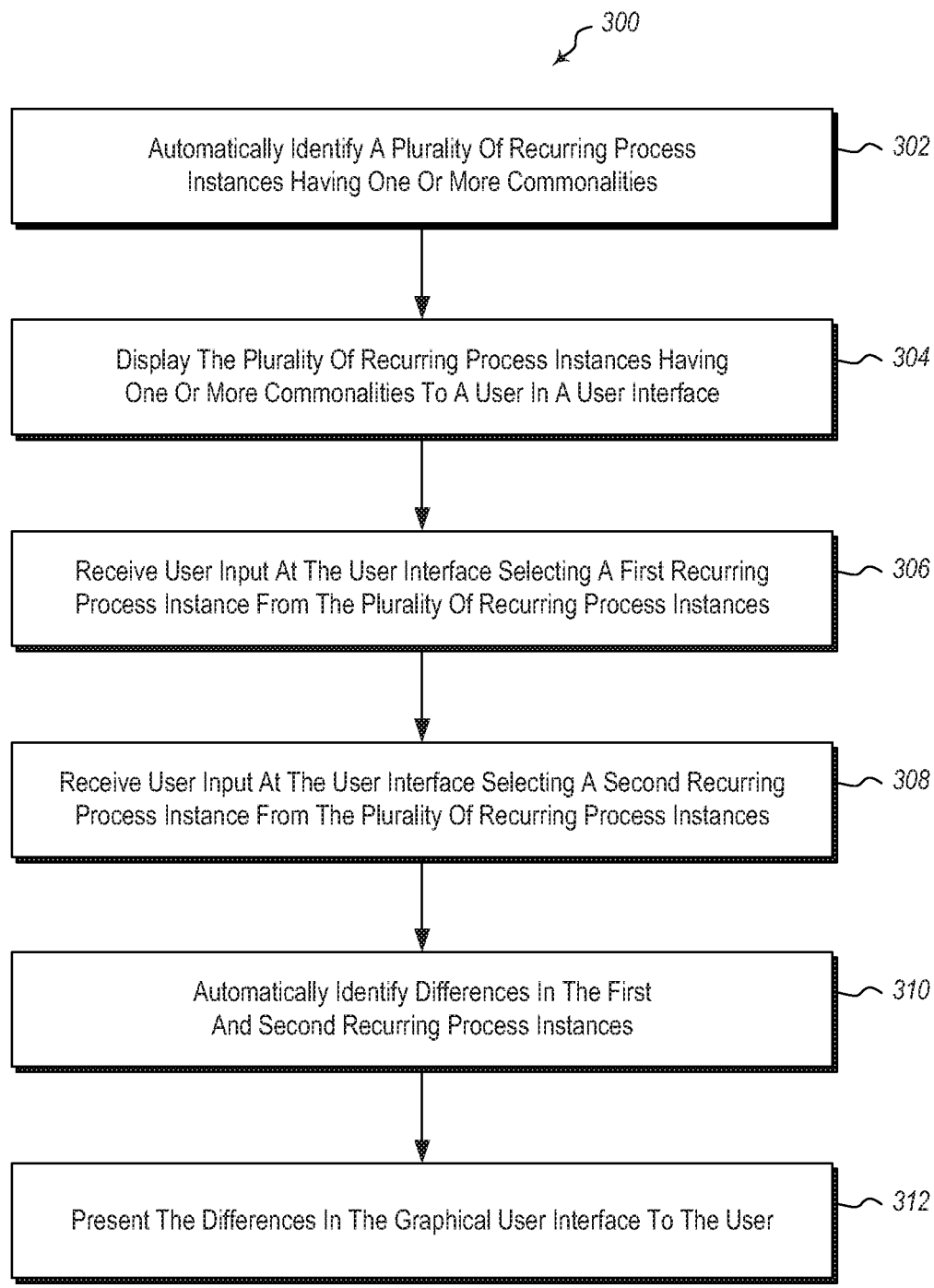
FIG. 3 illustrates a method of comparing recurring processes.

Referring now to FIG. 3, a method 300 is illustrated. The method 300 may be practiced in a distributed computing environment and includes acts for comparing recurring processes. The method includes automatically identifying a plurality of recurring process instances having one or more commonalities (act 302). For example, the method 300 may be practiced where automatically identifying a plurality of recurring process instances having one or more commonalities comprises identifying one or more of similar process definitions across multiple instances of recurring processes; identifying similar naming conventions across multiple instances of recurring processes; identifying similar execution histories across multiple instances of recurring processes and/or identifying other similarities.

For example, identifying similar process definitions across multiple instances of recurring processes may include identifying similar information factors such as names of the instances, process definition details, execution details (e.g., when and where the process instances were executed), user that submitted process instances, account used when process instances were submitted, API(s) and/or tools used to submit process instances, etc.

For example, identifying similar naming conventions across multiple instances of recurring processes may include examining path names, file name similarity, etc.

For example, identifying similar execution histories across multiple instances of recurring processes may include execution details, such as when recurring processes completed execution, data generated by the recurring processes, errors identified by running recurring processes, etc.

The method further includes displaying the plurality of recurring process instances having one or more commonalities to a user in a user interface (act 304). An example of this is illustrated in FIG. 2A, which illustrates a list of similar process instances in the process instance window 204.

The method further includes receiving user input at the user interface selecting a first recurring process instance from the plurality of recurring process instances (act 306). As illustrated at 212 in FIG. 2A, a user can select a recurring process instance for comparison.

The method further includes receiving user input at the user interface selecting a second recurring process instance from the plurality of recurring process instances (act 308). FIG. 2B illustrates selecting a second recurring process instance for comparison.

The method further includes automatically identifying differences in the first and second recurring process instances (act 310).

The method further includes presenting the differences in the graphical user interface to the user (act 312). For example, FIGS. 2C, 2D, 2E and 2F all show different examples of presenting differences to a user in a user interface.

The method 300 may be practiced where automatically identifying differences in the first and second recurring process instances comprises identifying differences in recurring process instance signatures.

The method 300 may be practiced where automatically identifying differences in the first and second recurring process instances comprises identifying differences in recurring process instance patterns.

The method 300 may be practiced where automatically identifying differences in the first and second recurring process instances comprises identifying differences in amount of data processed by different recurring process instances.

The method 300 may be practiced where automatically identifying differences in the first and second recurring process instances comprises identifying differences in the time of day for execution of different recurring process instances.

The method 300 may be practiced where automatically identifying differences in the first and second recurring process instances identifying differences in execution code for different recurring process instances.

In particular, if different recurring process instances are determined to be similar, but yet have the different characteristics describe above, it may be of interest to a user to identify be made aware of such instances and have the ability to investigate the differences between such instances.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard. Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which conic within the meaning and range of equivalency of the claims are to be embraced within their scope.

What is claimed is:

1. A computer system comprising:
one or more processors; and
one or more computer-readable media having stored thereon instructions that are executable by the one or more processors to configure the computer system to generate a visualization at a display to compare recurring processes, including instructions that are executable to configure the computer system to perform at least the following:
automatically identify one or more information factors corresponding to prior execution of each of a plurality of recurring process instances, at least one of the one or more information factors comprising at least one of the following relating to at least one of the plurality of recurring process instances: naming information, process definition information, an execution detail, user information, account information, application programming interface information, or tool information;
automatically identify a subset of the plurality of recurring process instances that share one or more commonalities among their corresponding information factors;
visually group the automatically identified subset of the plurality of recurring process instances having the one or more commonalities within a first user interface element;
receive input at the first user interface element selecting a first recurring process instance from the subset of recurring process instances;

receive additional input at the first user interface element selecting a second recurring process instance from the subset of recurring process instances;

automatically identify differences in one or more first properties of the first recurring process instance and one or more second properties of the second recurring process instance; and present the differences within a second user interface element visualized at a graphical user interface.

2. The computer system of claim 1, wherein automatically identifying the subset of the plurality of recurring process instances that share one or more commonalities comprises identifying similar process definitions across multiple recurring process instances.

3. The computer system of claim 1, wherein automatically identifying the subset of the plurality of recurring process instances that share one or more commonalities comprises identifying similar naming conventions across multiple recurring process instances.

4. The computer system of claim 1, wherein automatically identifying the subset of the plurality of recurring process instances that share one or more commonalities comprises identifying similar execution histories across multiple recurring process instances.

5. The computer system of claim 1, wherein automatically identifying the differences in the one or more first properties of the first recurring process instance and the one or more second properties of the second recurring process instance comprises identifying differences in recurring process instance signatures.

6. The computer system of claim 1, wherein automatically identifying the differences in the one or more first properties of the first recurring process instance and the one or more second properties of the second recurring process instance comprises identifying differences in recurring process instance patterns.

7. The computer system of claim 1, wherein automatically identifying the differences in the one or more first properties of the first recurring process instance and the one or more second properties of the second recurring process instance comprises identifying differences in an amount of data processed by different recurring process instances.

8. The computer system of claim 1, wherein automatically identifying the differences in the one or more first properties of the first recurring process instance and the one or more second properties of the second recurring process instance comprises identifying differences in a time of day for execution of different recurring process instances.

9. The computer system of claim 1, wherein automatically identifying the differences in the one or more first properties of the first recurring process instance and the one or more second properties of the second recurring process instance comprises identifying differences in executed code for different recurring process instances.

10. The computer system of claim 1, wherein at least one of the presented differences includes an indication of a degree of difference.

11. In a computing environment, a method of generating a visualization for comparing recurring processes, the method comprising:

automatically identifying one or more information factors corresponding to prior information of each of a plurality of recurring process instances, at least one of the one or more information factors comprising at least one of the following relating to at least one of the plurality of recurring process instances: naming information, process definition information, an execution detail, user information, account information, application programming interface information, or tool information;

automatically identifying a subset of the plurality of recurring process instances that share one or more commonalities among their corresponding information factors;

visually grouping the automatically identified subset of the plurality of recurring process instances having the one or more commonalities within a first user interface element;

receiving input at the first user interface element selecting a first recurring process instance from the subset of recurring process instances;

receiving additional input at the first user interface element selecting a second recurring process instance from the subset of recurring process instances;

automatically identifying differences in one or more first properties of the first recurring process instance and one or more second properties of the second recurring process instance; and presenting the differences within a second user interface element visualized at a graphical user interface.

12. The method of claim 11, wherein automatically identifying the subset of the plurality of recurring process instances that share one or more commonalities comprises identifying similar process definitions across multiple recurring process instances.

13. The method of claim 11, wherein automatically identifying the subset of the plurality of recurring process instances that share one or more commonalities comprises identifying similar naming conventions across multiple recurring process instances.

14. The method of claim 11, wherein automatically identifying the subset of the plurality of recurring process instances that share one or more commonalities comprises identifying similar execution histories across multiple recurring process instances.

15. The method of claim 11, wherein automatically identifying the differences in the one or more first properties of the first recurring process instance and the one or more second properties of the second recurring process instance comprises identifying differences in recurring process instance signatures.

16. The method of claim 11, wherein automatically identifying the differences in the one or more first properties of the first recurring process instance and the one or more second properties of the second recurring process instance comprises identifying differences in recurring process instance patterns.

17. The method of claim 11, wherein automatically identifying the differences in the one or more first properties of the first recurring process instance and the one or more second properties of the second recurring process instance comprises identifying differences in an amount of data processed by different recurring process instances.

18. The method of claim 11, wherein automatically identifying the differences in the one or more first properties of the first recurring process instance and the one or more second properties of the second recurring process instance comprises identifying differences in a time of day for execution of different recurring process instances.

19. The method of claim 11, wherein automatically identifying the differences in the one or more first properties of the first recurring process instance and the one or more second properties of the second recurring process instance comprises identifying differences in executed code for different recurring process instances.

20. A computer program product comprising one or more computer-readable storage media having thereon computer-executable instructions that are structured such that, when executed by one or more processors of a computing system, the computing system is caused to at least:

automatically identify one or more information factors corresponding to prior execution of each of a plurality of recurring process instances, at least one of the one or more information factors comprising at least one of the following relating to at least one of the plurality of recurring process instances: naming information, process definition information, an execution detail, user information, account information, application programming interface information, or tool information;

automatically identify a subset of the plurality of recurring process instances that share one or more commonalities among their corresponding information factors;

present a user interface, wherein the user interface:

visually groups the automatically identified subset of the plurality of recurring process instances have the one or more commonalities within a first user interface element;

receives user input at the first user interface element selecting a first recurring process instance from the subset of recurring process instances; and receives additional user input at the first user interface element selecting a second recurring process instance from the subset of recurring process instances;

automatically identify differences in one or more first properties of the first recurring process instance and one or more second properties of the second recurring process instance; and automatically present the differences within a second user interface element visualized at the user interface.

21. The computer program product of claim 20, wherein automatically identifying the subset of the plurality of recurring process instances that share one or more commonalities comprises identifying at least one of:

similar process definitions across multiple recurring process instances, similar naming conventions across multiple recurring process instances, or similar execution histories across multiple recurring process instances.

\* \* \* \* \*